United States Patent [19]

Gauvin et al.

[11] Patent Number: 5,790,800

[45] Date of Patent: Aug. 4, 1998

[54] CLIENT APPLICATION PROGRAM MOBILIZER

[75] Inventors: William J. Gauvin, Leominster; Raymond Cheung, Westford; Kevin P. Brosnan, North Reading; Edward J. Taranto, Boston, all of Mass.

[73] Assignee: Digital Equipment Corporation, Maynard, Mass.

[21] Appl. No.: 543,096

[22] Filed: Oct. 13, 1995

[51] Int. Cl.$^6$ .................................................. G06F 15/163
[52] U.S. Cl. ............................... 395/200.57; 395/200.33
[58] Field of Search .............................. 395/200, 200.12, 395/200.33, 200.57

[56] References Cited

U.S. PATENT DOCUMENTS

| | | | |
|---|---|---|---|
| 5,325,527 | 6/1994 | Cwikowski et al. | 395/200.52 |
| 5,329,619 | 7/1994 | Page et al. | 395/200.33 |
| 5,367,698 | 11/1994 | Webber et al. | 395/200.33 |
| 5,497,463 | 3/1996 | Stein et al. | 395/200.33 |
| 5,515,508 | 5/1996 | Pettus et al. | 385/200.33 |
| 5,574,854 | 11/1996 | Blake et al. | 395/183.04 |

Primary Examiner—Parshotam S. Lall
Assistant Examiner—Kenneth R. Coulter
Attorney, Agent, or Firm—Dirk Brinkman

[57] ABSTRACT

In a distributed computer environment, an apparatus enables a client application of a mobile client processor to communicate with a server application of a server processor. The client application generates a request to communicate with the server processor. The client processor includes transport procedures for processing the request. The procedures and the client application expect a connection to be in place between the client processor and the server processor via a selected circuit of the communications network at the time the request is made. Therefore, the client processor includes an interceptor for intercepting the request and a communication manager for connecting the client processor and the server processor via the selected circuit of the network. Once the connection is established, the request is passed to the transport procedures.

19 Claims, 9 Drawing Sheets

CLIENT APPLICATION PROGRAM MOBILIZER

FIELD OF THE INVENTION

This invention relates generally to communicating in a distributed computer environment, and more particularly to communicating between a server computer and a client mobile computer.

BACKGROUND OF THE INVENTION

In a distributed a computer environment (DCE), a client computer communicates with a server computer via a communication network. The network can be a local area network (LAN), or a wide area network (WAN). Generally, the communication connection between the client and server computers is a physical or virtual circuit of the LAN or WAN. Communications between client and server applications executing on the computers are usually conducted according to well known communication protocols. Typical protocols used in the DCE can include IPX/SPX, NetBEUI, TCP/IP, DECnet with the transport interface provided by Winsock, and NetBios.

In most traditional client computers, client application programs do not have the knowledge and capability to establish the communication circuit, nor the ability to manage communications after the circuit has been established. For example, client applications that use UNIX based file transfer protocol (FTP) typically call library programs and transport procedures to handle the more intricate communications interactions. The prior art library programs expect a circuit to be in place to make a connect request to initiate communication with a server. If the circuit is in place, then the request can be processed to activate communication using, for example, the TCP/IP protocol. If the circuit is not in place, then a simple invocation of the FTP library processes by the client application will unconditionally fail. Other applications, such as Netscape and Mosaic for Internet, would similarly fail.

Currently, there are no means which can intercept client requests for server services if a communications circuit is not established between the client and server. Nor are there means which monitor the state of an established circuit to ensure that the communications link is properly maintained without affecting the application. This is a particular problem if the client application program is executing on a portable or mobile client computer. A mobile client computer can be connected to a remote server computer from any location which has access to a communication network.

Currently, in order to establish a communication link, a user of the mobile client computer at a particular location must first determine if the network accessible to communicate with a server computer at another location is a LAN or a WAN. Once the type of network has been determined, the user may have to dial-out to reach a remote access point, such as a router or gateway, using a separately invoked application such as the Microsoft Telephony Application Programming Interface (TAPI). TAPI is a well-defined interface which provides dial-out and auto-answer services for many different vendors' hardware. In order to dial-out, the user may also need to set up a hardware network interface, for example a modem. Preparing the modem to communicate may involve selecting numerous communication options, such as baud rates and parity bits.

Dialing-out may also require the user to know the configuration of the telephone switch used at the remote location. For example, if the remote location is a hotel or a business, additional digits may need to be dialed before a public access telephone network is reached. The user may also have to select a common carrier such as ATT, MCI, or SPRINT after the telephone network is reached. Depending upon the carrier selected, different calling card numbers may be used. Additionally, the user may need to provide security codes to gain access to the remote gateway or router. Furthermore, a logon dialogue may need to be conducted with the server computer before the server application can be reached and communication can begin. If the mobile computer is used at a number of different remote locations, or with a number of different servers, the difficulty of managing mobile connections increases.

It is desired to simplify the operation of a mobile computer in a distributed computer environment. In addition, it is desired to allow a client application to operate in a mobile environment without re-design and re-engineering of the application. Furthermore, is desired to have a mobile computer adjust its dialing sequences automatically for any predetermined location where the mobile computer is used.

SUMMARY OF THE INVENTION

In a distributed computer environment, a client application executing on a mobile client application desires to communicate with a server processor executing a server application via a communication network. The network includes a plurality of communication circuits. In order to conduct the communication, the client application generates a request to communicate with the server processor. The client processor includes means, in the form of library programs and transport procedures connected to the client application, for processing the communication request. Both the means for processing, and the client application expect a connection to be in place between the client processor and the server processor via one of the circuits of the communications network at the time the client application makes the request.

In one aspect of the invention, the client processor includes means for intercepting the request. In response to intercepting the request, a connection is made between the client processor and the server processor via the selected circuits of the network. After the connection is made, the request is passed to the means for processing the request. As an advantage, this allows a mobile client processor to communicate with the server processor from a number of different access locations of the network, without making any modifications to the client application.

In another aspect of the invention, the client processor further includes a memory storing a communication database. The communication database stores information necessary for connecting the client processor and the server processor to each other. The information is dependent on a selected access location and a communication protocol to be used on the selected circuit. The communication database includes a location database, a security database, a profiles database, a resources database, and a script database. The resource database includes a plurality of communication resource objects; a plurality of communication resource objects such as modem, communication, telephone number, calling card, location, telephone list, logon, service, and network access communication resource objects. A set-up graphic user interface for adding, editing, and deleting the plurality of communication resource objects. The script database includes a plurality of script files and a script processor for processing a selected one of the plurality of script files to connect the server processor and the client processor.

DETAILED DESCRIPTION OF A PREFERRED EMBODIMENT

Figure 1:
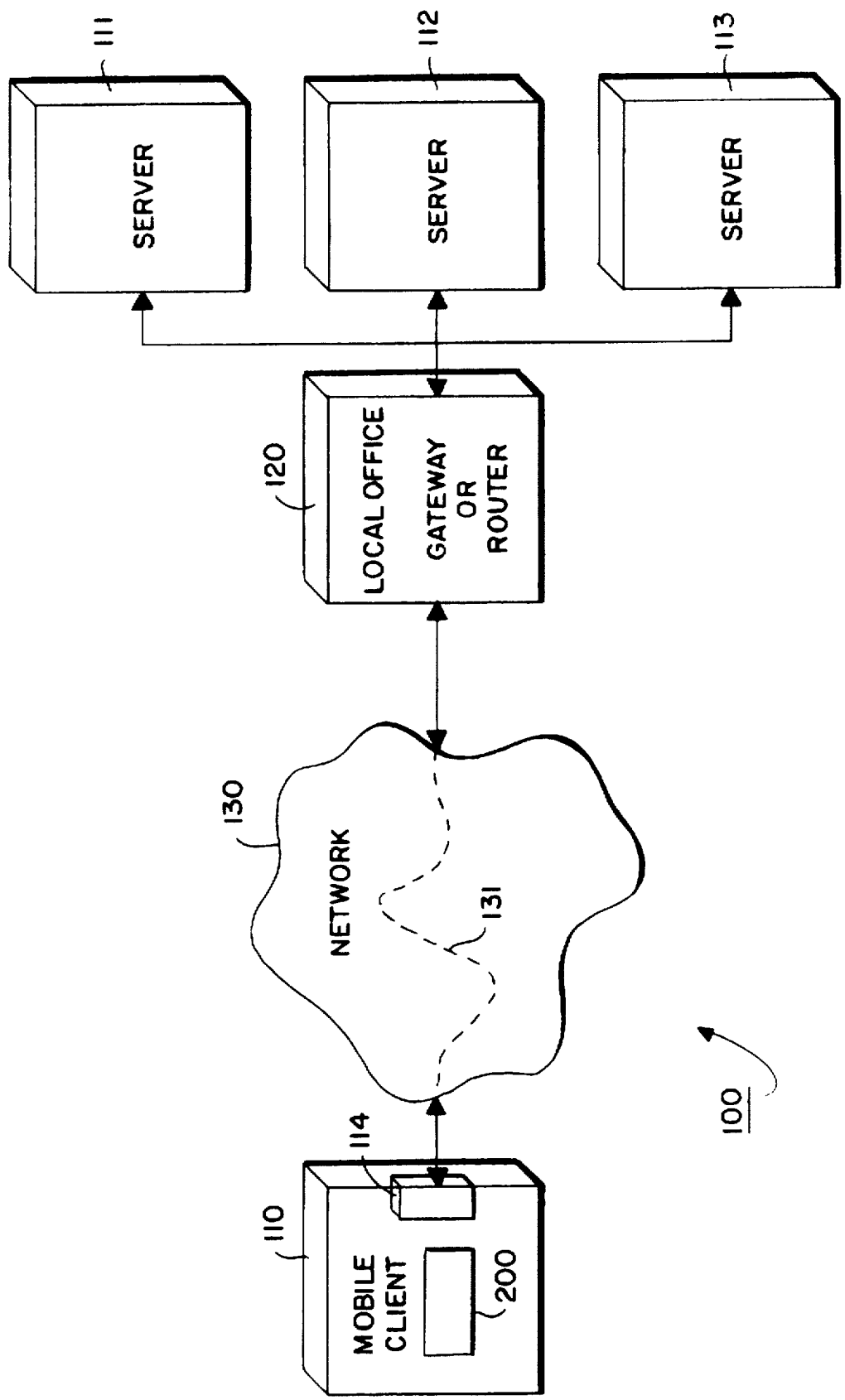
FIG. 1 is a block diagram of a distributed computer environment including a mobile client computer configured according to the principles of the invention.

FIG. 1 shows a mobile distributed computer environment (DCE) 100 including a mobile client computer 110, server computers 111–113, and a gateway or router 120. The mobile computer 110 can connect to any of the clients 111–113 via a communications network 130. The network 130 can have numerous access locations such as residences, businesses, hotels, public phones, and the like. If the network uses cellular or satellite links, the locations can be anywhere where the links are accessible.

The client computer 110 is of the type which is easily transported to the numerous locations, e.g., the computer 110 can be "mobile." For example, the mobile client computer 110 can be a portable, lap-top, or notebook PC. The mobile computer 110 is equipped with a hardware network interface device 114, such as a modem. The modem 114 interfaces the signals of the computer 110 to the signals of the network 130 at any of the access locations.

The client computer 110 executes standard operating system software using, for example, a windowing environment, e.g., Microsoft Windows 3.1, and Windows95, NT, etc. The computer 110 can also execute client applications invoked by the windowing software when the user "clicks" a mouse on displayed icons representing the applications. The computer 110 also includes a memory for storing data and instructions, and a processor for executing the instructions. The data and instructions can be persistently stored on fixed or removable storage devices, such as magnetic or optical disks, while the computer 110 is operating, or not.

The server computer 111–113 and the gateway or router 120 are made of standard hardware, and are configured to provide computing services to multiple client computers. The network 130 can be a local area network (LAN), a wide area network (WAN), or combinations thereof. The network includes physical or virtual circuits, e.g., circuit 131, for connecting the mobile computer 110 with the server computers 111–113.

Figure 2:
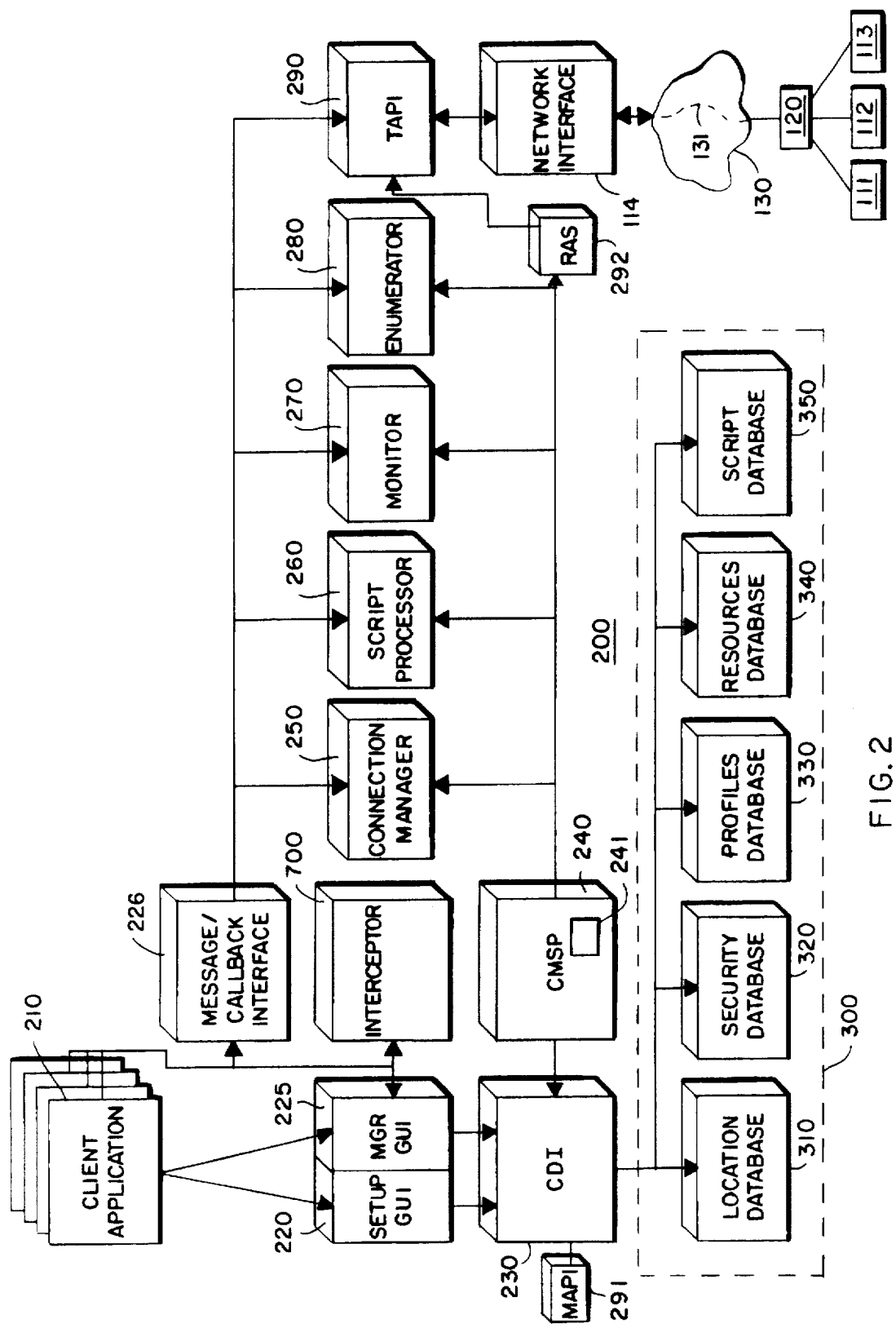
FIG. 2 is a block diagram of a communications manager of the mobile client computer of FIG. 1.

As described with respect to FIG. 2, and in accordance with a preferred embodiment of the invention, the mobile computer 110 includes a communications manager (CM) 200 to provide connectivity between registered mobile client applications 210, and the fixed servers 111–113. The communications manger 200 provides the capability to activate, monitor, multiplex, and deactivate virtual and physical circuits 131 of the network 130.

The communications manager 200, using a communications database 300, can manage network protocols such as IPX/SPX, NetBEUI, TCP/IP, and DECnet using corresponding serial communications line protocols. The database 300 can include information necessary to initiate and maintain a communications connection between the mobile computer 110 at a particular access location of the network 130, and the servers 111–113. Information in the database 300 can be pre-configured or created as needed by users and network administrators. The information of the database 300 can be imported from the servers 111–113, or exported to other mobile computers.

The processes of the communications manager 200 are exposed to users of the registered applications 210 in two views: a set-up graphic users interface (GUI) 220, and a manager GUI 225. The set-up and manager GUIs interact with a connection manager 250, a script processor 260, a monitor 270, and an enumerator 280 via an interceptor 700 and a communication manager service provider (CMSP) 240. Messages can be communicated with the GUIs via a message/callback interface 226.

The set-up GUI 220 can be used to maintain the database 300 using a communication database interface (CDI) 230. The set-up GUI 220 can be used to create information in the database 300 necessary to manage communications sessions. For example, the database 300 can include a locations database 310, a security database 320, a connection profiles database 330, a resources database 340, and a script database 350.

The communications manager 200 depends on a set of network management commands, such as ANSWER, SEND, WAIT, READ, etc., to enable (connect), monitor, and disable (disconnect) network protocol stacks. The management commands can be provided in default script files of the script database 350. The script files are modifiable by users using for example, the set-up GUI 220 or standard word processing software.

The set-up GUI 220 can also be used to create information for the connection profiles database 330. A particular profile can include information describing the current location of the mobile computer, and information describing the last connection that was established between the client and one of the servers. As an advantage, this facilitates multiple communication sessions from the same location.

While establishing a connection, the manager GUI 225 can display information showing the progress being made in driving communication signals from the hardware interface 114, through the network 130 and gateway 120, to a selected one of the servers 111–113. In the case that the attempt to make a connection with one of the servers 111–113 fails, the user can study this information and update the database to correct the failure.

During the operation of the communications manager 200, the connection manager 250, in response to a client communications application 210 executing, receives a connection request. The connection manager 250, upon receiving the request, proceeds with the various connect phases involving different communication resources. In the case of a WAN, establishing the requested connection may require up to three levels of connection processing. Initially, a local connection needs to be made to a switched telephone network at a public access location. Once the network has been reached, one of a number of common carriers may need to be selected. Then, upon reaching the desired gateway 120, one of the servers 111–113 needs to be selected to execute a server process.

The communication database 300 is object oriented. An object encapsulates a method and data to be manipulated by the method. The CDI 230 provides application programming interfaces (API), e.g., pointers to the objects of the database 300. Having the pointers, the client applications 210 can perform the process steps of the objects to create, edit, remove, and access the object information. For example, the client applications 210 can use the CDI 220 to add and remove objects which represent communication resources 340, and to determine information about the resources.

The communication manager service provider (CMSP) 240 provides the actual connection management. The CMSP 240 has access to a local database 241 of established and active connections. The CMSP 240 detects and attempts to make a connection, and the CMSP 240 can multiplex connections. Multiplexing meaning that several communication connections can be ongoing concurrently. The CMSP 240 activates the manager GUI 225 to enable and disable a connection.

The CMSP 240 interacts with the connection manager 250, the script processor 260, the monitor 270, and the enumerator 280 described in further detail below. This infrastructure can use windows message passing, and callback procedures of the interface 226 to notify the registered client applications 210 of connection events.

The communication manager 200 can also use existing technologies, such as the Telephony Application Programming Interface (TAPI) 290, and Message Application Programming Interface (MAPI) 291 provided by Microsoft Corporation to support basic communication functionality. The TAPI 290 provides dial-out and auto-answer services for many different vendors' hardware. The MAPI 291 provides an object oriented address and telephone book. The communication manager 200 can also use the Microsoft Remote Access Service application programming interface (RAS) 292. The RAS 292 can be used to establish communication connections from a remote location.

During operation of the communication manager 200, the setup GUI 220 is used to configure all the communication resources 340 necessary to establish and continue communication sessions, e.g., one or more connections. Once the resources have been organized into profiles 330, the user can use the manager GUI 225 to establish and monitor the connections. The individual physical and logical resources and combination of resources necessary to maintain a connection, e.g., profiles 330, are stored in the communication database 300.

A resource is an object representing process steps and data manipulated by the process steps while establishing a connection. For example, a resource includes a resource name, and information describing how the resource should be accessed and processed. The access information may refer to other resources in order to establish a connection. Many of the resources associated with a common connection scenario can be pre-configured. For example, a method used by a user to connect to the home office from a predetermined remote location can be provided by a system administrator. In this case, the user can immediately use the pre-configured resources. Otherwise, the user must create the information describing the resources as they are required.

Figure 3:
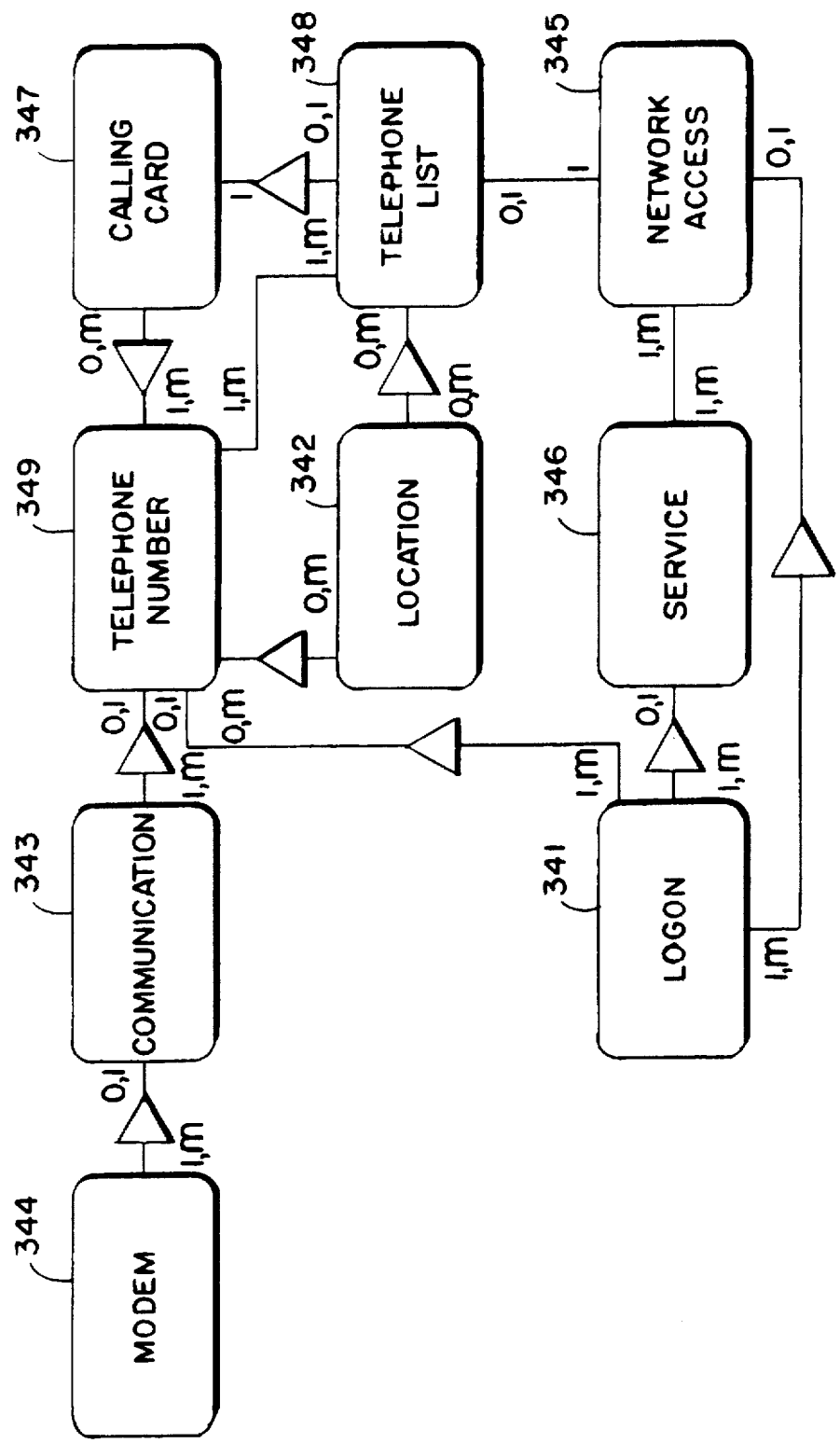
FIG. 3 shows the relationship of communications resources of the communication manager of FIG. 2.

FIG. 3 identifies the resource objects 341–349 that can be used by the communication manager 200 to form a connection according to a preferred embodiment of the invention. FIG. 3 uses the Coad/Yourdan methodology to show the relationships among the resource objects. The Coad/Yourdan methodology is described in Object Oriented Services, 2nd, ed., P. Coad and E Yourdan, Object International, 1991, and Object-oriented Design, P Coad and E. Yourdan, Object International, 1991.

As a brief explanation, two types of lines are used in depicting a relationship between resource objects, namely, directed and undirected lines. The directed lines, those with arrows, depict a permanent relationship between a whole object and object that is a part of the whole object. The directed line indicates an "is-part-of" object and terminates at the whole object. The directed line indicates a permanent one-way association where the whole object always contains the is-part-of object as an attribute. Undirected lines, those without arrows, indicate a temporary relationship between objects at a particular instant in time.

The numbers appearing at either ends of the lines connecting resource objects indicate the cardinality of the relationship. As an example, values of "1.m" appearing at the end of the line connected to the whole object indicate that the whole object can contain any number of is-part-of objects. In the case of "0.m," the whole object can contain any number of is-part-of objects, including none. A value of "1" indicates that an is-part-of object, at any instant in time, can only belong to one whole object.

Now, a more detailed description of the resource objects according to the preferred embodiment of the invention. A logon resource object 341 contains user name and password information. The name/password combination is encapsulated as a separate object to facilitate the handling of the information in the security database 320, and to allow for the importing and exporting of this type of resource object without breaching security. The logon resource 341 can be used by other resource objects 345, 346, and 349. The logon object 341, as well as all of the other objects 342–349, also includes procedures for creating and using the information encapsulated in the object.

A location resource object 342 contains dialing information associated with a particular location. The information can include city, area, and country codes. The location information can also include local and long distance prefix numbers. The prefix numbers may be required to gain access to a local telephone network, e.g., a network controlled by a hotel switchboard, or a corporate telephone network. If the network uses radio links, then the location information can include, for example, cellular phone access codes. The location resource object 342 also contains the procedures to create, access and use the dialing information.

A communication resource object 343 is used to support WAN access with, or without dialing. Information contained in the communication resource 343 describes communication parameters, such as data width (7 or 8 bits), parity, stop bits, flow control (Xon/Xoff), baud rate, re-dial time-outs, speaker (audio) control, and a pointer to a modem resource object 344.

The modem resource object 344 contains information describing the modem that is being used to access the network 130. The information can include error correction and compression information, as well as information describing how the modem should dial and respond to an answer signal, perhaps using escape sequences.

A network access resource object 345 contains information describing how the mobile computer 110 should access any of the servers 111–113. The information can include the type of network to be used to access the selected server, e.g., LAN, or WAN. If the network is a wide area network, then the connection to the circuit 131 can be made by dialing a telephone number. For a local area network, it is presumed that the client 110 is physically connected to the network.

Transport information of the network access resource object 345 indicates the network protocols to be used, e.g., TCP/IP, IPX/SPX, NetBEUI, and so forth. The network access resource object can further reference a telephone list resource, a logon resource, a service resource, and a script file. The script files, described in further detail below, can store commands to be executed while making a connection using a particular network.

The service resource object 346 contains information describing the server to be accessed. This information can include references to a logon and network access resource to be used to make a connection to the selected server. The information can also include a reference to a script file for connecting to the selected server.

A calling card resource object 347 contains information about a particular user's calling card number, such as carrier identification, e.g., ATT, Sprint, MCI, etc., account number, personal identification number (PIN), local and foreign exchanges, and a reference to a telephone list resource object which is bound to a particular calling card resource.

The telephone list resource object 348 is used to maintain a list of telephone number resources. In the case where the destination being called has multiple associated telephone numbers, the numbers are called in the order they are presented in the list. The communication manager 200 can maintain two separate type of telephone number lists. One type of list is bound to a calling card object 347, and the other types is bound to a network access resource object 345. The telephone lists resource object 348 can reference other telephone lists resources.

The telephone number resource object 349 contains the information necessary to dial a particular telephone number. The information stored for the particular telephone number can override default communication information stored in the communication resource 343, such as baud rate, area code, data width, parity, stop bits, etc. The telephone number resource can reference a network access location and a calling card resource.

Figure 4:
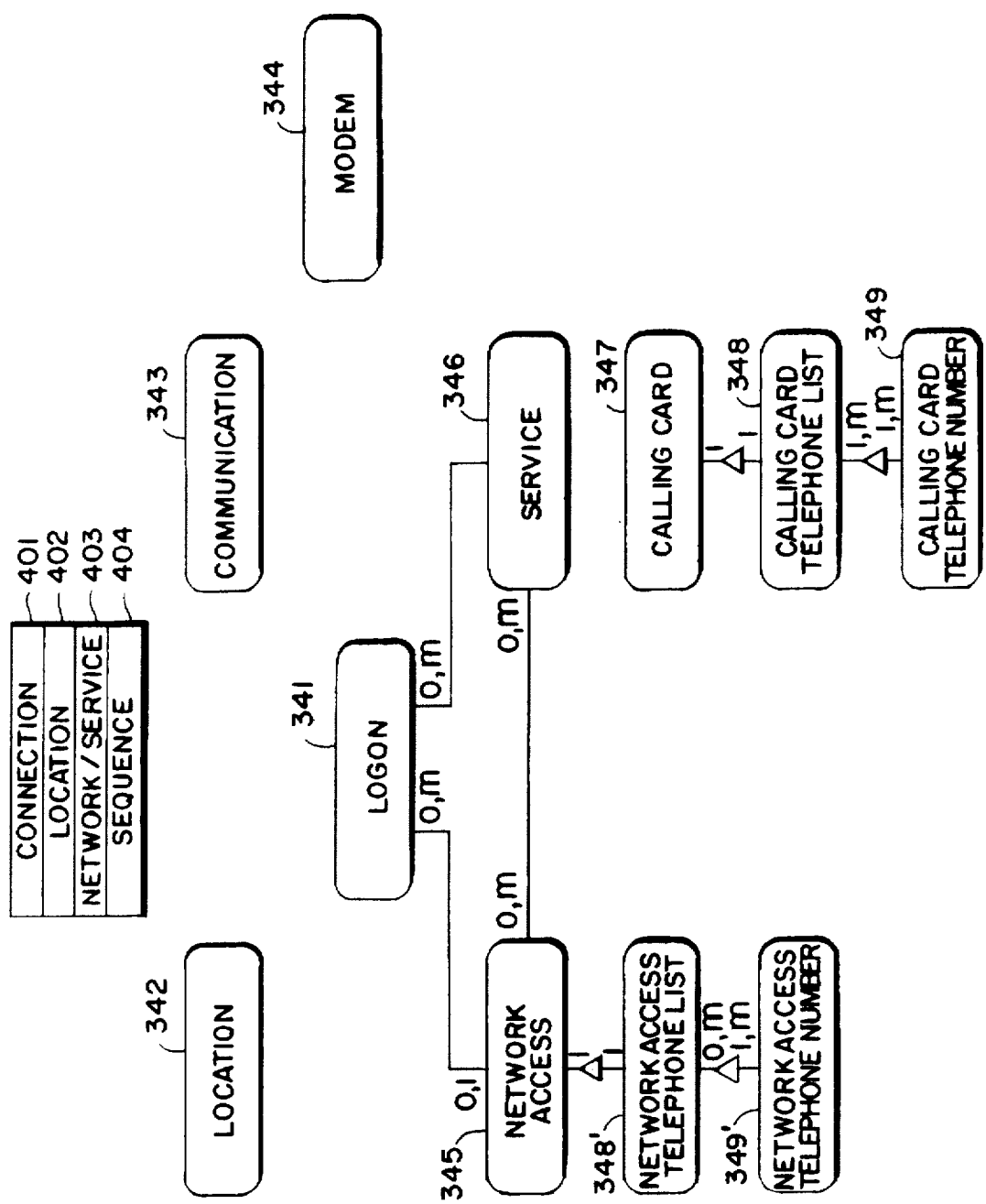
FIG. 4 shows the state of the relationships of the resources at connect time.

FIG. 4 shows the state of the relationships of the resource objects at the time that a connection is about to be made. The connection can be made using, for example, a connection dialogue window 401. The connection window 401 can show default resources which are to be used by the communications manager 200 to enable, monitor, and disable a particular connection. For any connection, the dialogue window 401 minimally displays a location 402, and network access and service information 403. The window 401 also displays a sequence 404 of digits to be dialed, including calling card and access numbers.

The CDI 230 includes a number of resource specific application programming interfaces (APIs) coded as, for example, a procedure call. The interfaces can be used to manipulate the information associated with specific resources. For example, interfaces for the calling card resource object 347, can include get_Account, set_Account, get_PIN, set_PIN, get_TelephoneList, set_TelephoneList, add_TelephoneNumber, update_TelephoneNumber, and delete_TelephoneNumber. Similar interfaces exist to set and get information of other resource objects. The CDI 230 maintains resource objects 341—349 persistently. This means that whenever an object is added, modified, or deleted in memory, the change is propagated to disk storage for long term storage.

As previously stated, the network access resource object 345 and the service object 346 can reference script files stored in the script database 350. The script files are processed by the script processor 260. Each line of a script file can include a connection phase identifier, and a command or comment. The phases of a connection can include: pre-dial, network access, and server access. Labels can be used for flow control, comments have no effect on script processing.

Figure 5:
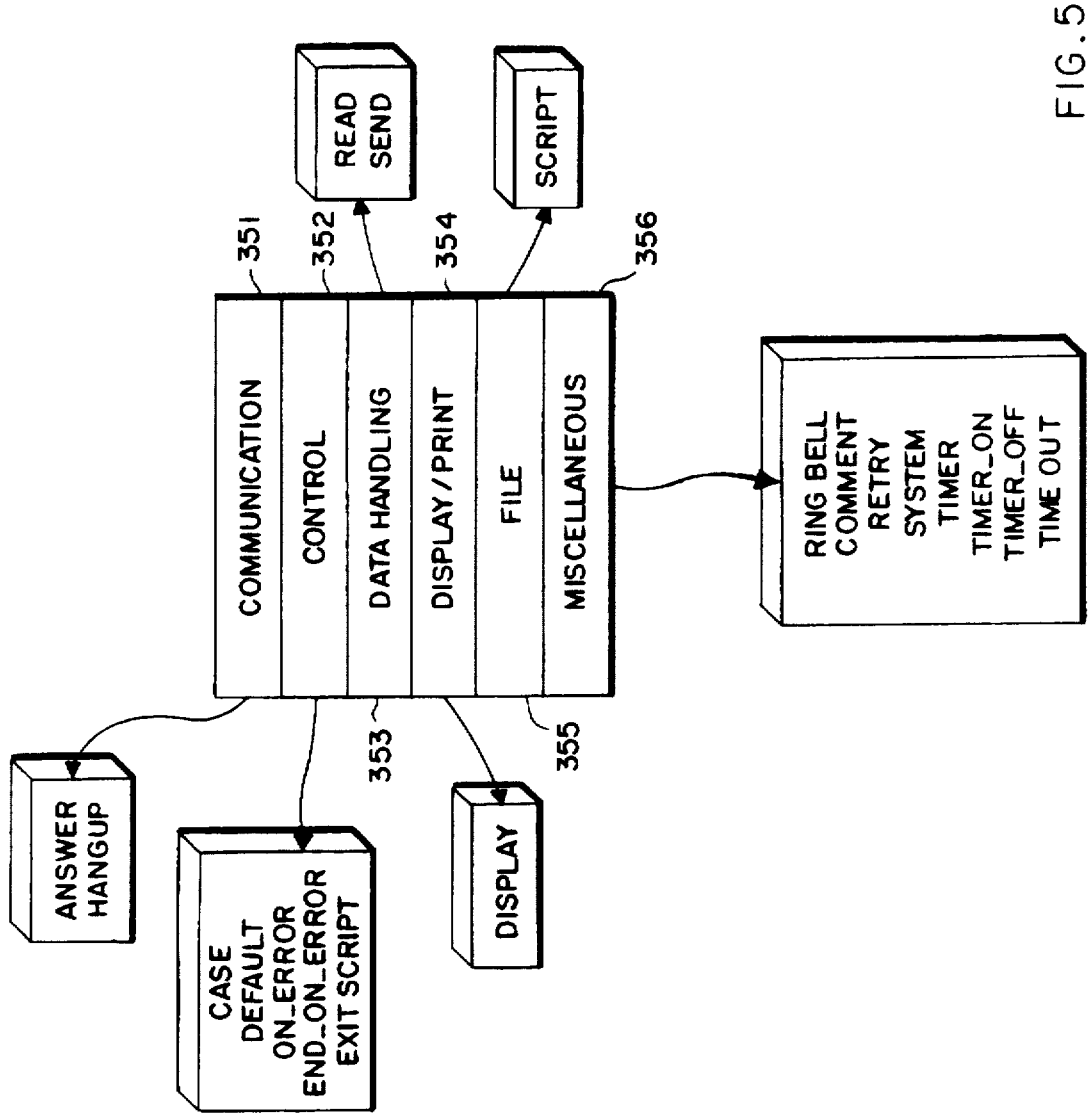
FIG. 5 is a block diagram of script commands.

A list of different types of script commands is shown in FIG. 5. The following is a brief description of different types of commands which can be used in script files. The commands can include communication 351, control 352, data handling 353, display/print 354, file 355, and miscellaneous 356 types of commands.

Communication

A HANGUP command terminates a connection. An ANSWER command waits for an incoming call.

Control

A CASE command selects an action depending on the contents of a variable passed with the command. A DEFAULT command is used to specify an action when the variable of the CASE command fails to specify a known action. An ON_ERROR command is used to indicate the beginning of error processing commands in a script file. An END_ON_ERROR command is used to mark the end of a error processing segment of the script file. An EXIT_SCRIPT command terminates script processing. Flow control is returned to the next higher level of script file, if any. An EXIT command terminates all script processing without changing the current state of the connection.

Data Handling

A READ command accepts input data from the communication circuit 131 and stores the data in a named variable. A SEND command can be used to transmit characters as analogue or digital signals over the communication circuit 131.

Display/Print

A DISPLAY command displays or prints a specified string on a monitor using the communication manager display window.

File

A SCRIPT command can be used to process commands of another script file as a sub-process. The name of the sub-process is forwarded with the command.

Miscellaneous

A RING-BELL command cause a audible tone to be emitted by the mobile computer 110. A COMMENT command can be used to annotate script files. Any text contained on a COMMENT line is ignored by the script processor 260. A RETRY command causes a next line of the script file to be processed if a time-out error should occur. A SET command can be used to assign values to variables used in the script file. Variables can be set to constant character strings, integers, or other expressions of variables.

A SYSTEM command can be used to execute a command of the underlying operating system, e.g., DOS, Windows, or NT. A TIMER command is used to specify a time-out period, e.g., the number of seconds to wait before indicating a time-out condition if no response to the previous commands is received. The timer that is used by the TIMER command can be enabled and disabled with TIMER_ON and TIMER_OFF commands, respectively. A TIME_OUT command forces an immediate time-out condition.

A problem exists. The prior art software processes and data structures necessary to establish and maintain a communication circuit between the client applications 210 and a servers 111–113 assume that the circuit 131 is extant. However, for mobile client applications 210 making a request of the servers 111–113, this may not be true. Therefore, the present invention, as a solution provides for the interception of client application requests. The requests are intercepted by the interceptor 700.

Figure 6:
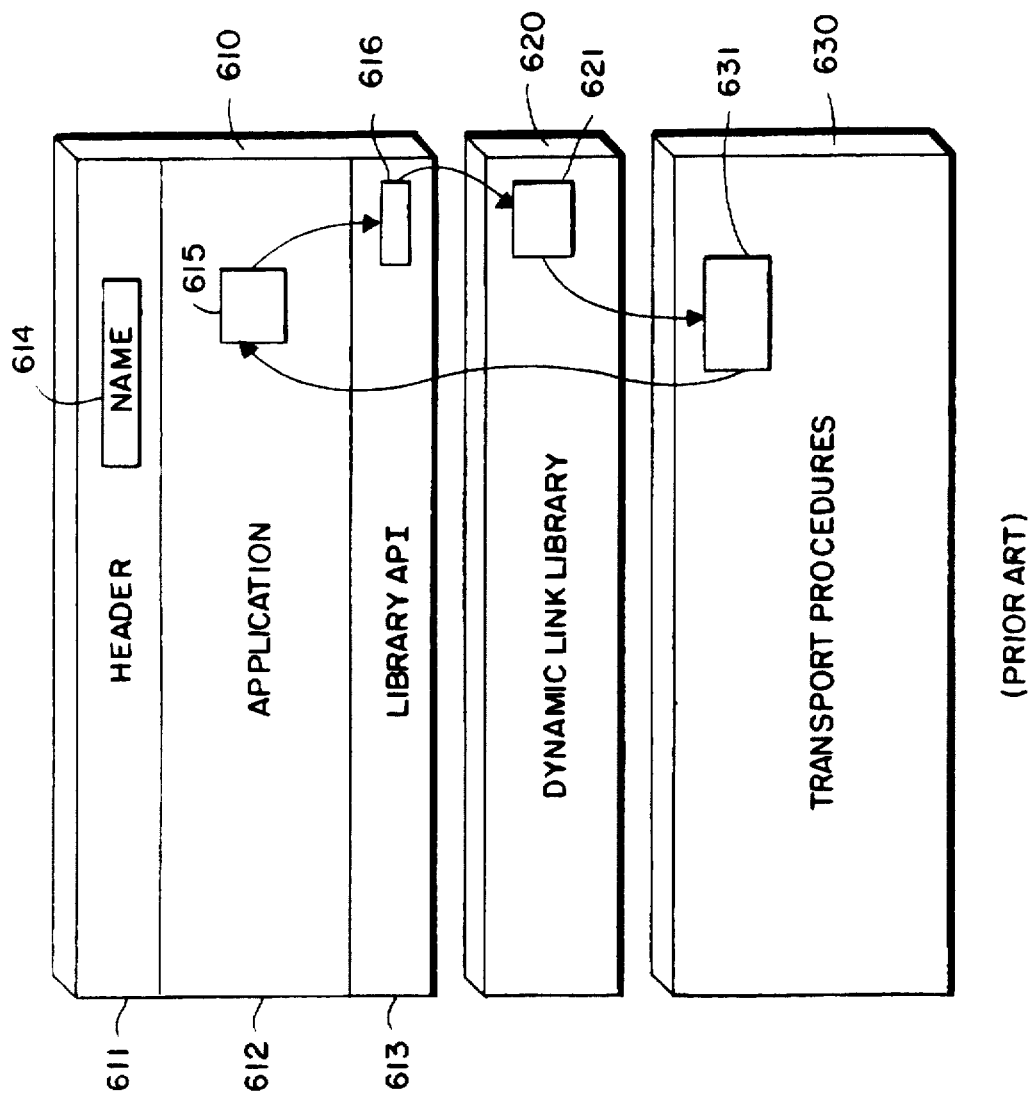
FIG. 6 is a flow diagram of the execution paths between a prior art client application, library programs and transport procedures.

FIG. 6 shows how prior art client applications that assume the existence of a communication connection are directly linked to communications transport procedures. The client application 610 uses file transfer protocols (FTP) and transport procedures 630 (TCP/IP) to communicate with one of the servers 111–113.

Typically, the client application 610 and the transport procedures 630 are independently developed and provided by different vendors. Therefore, a dynamic link library (DLL) 620 is typically used to interface the application 610 to the run-time transport procedures 630. The DLL 620 manages the relocation of the links between the application 620 and the system level transport procedures 630.

The client application 610 includes a header 611, application procedures 612, and an application programming interface 613. The header 611 includes a name 614 of the DLL 620 required when the application 610 is executed. For example, if the client application 610 is executed with the Microsoft Windows system, the DLL that provides the interface to TCP/IP transport procedures is named "Winsock."

When the application 610 is loaded into the memory of the computer 110, the required DLL 620, e.g., the Winsock DLL, is also loaded. The DLL 620 provides relocatable interfaces, known as "sockets," to transport procedures 630, e.g., TCP/IP protocol stacks and procedures. The sockets can include, for example, bind, connect, read, write, and close sockets if the library is Winsock. Other protocols have similar interfaces. The transport procedures 630 provide the actual system level functionality for transporting data and managing the communication link.

During operation of the communication manager, the client application 610 can be executed by, for example, clicking on an icon representing the application 610 with a mouse. While the application 610 is executing, a procedure 615 of the application 610 requests communication transport services. Therefore, the execution flow is directed via one of the library API 616, e.g., a relocatable "jump" type of instruction, to a corresponding DLL routine 621. The DLL routine 621 directs the execution flow to the actual transport procedure 631 charged with performing the requested transport services. After the procedure 631 completes, the execution flow returns to the application procedure 615.

Figure 7:
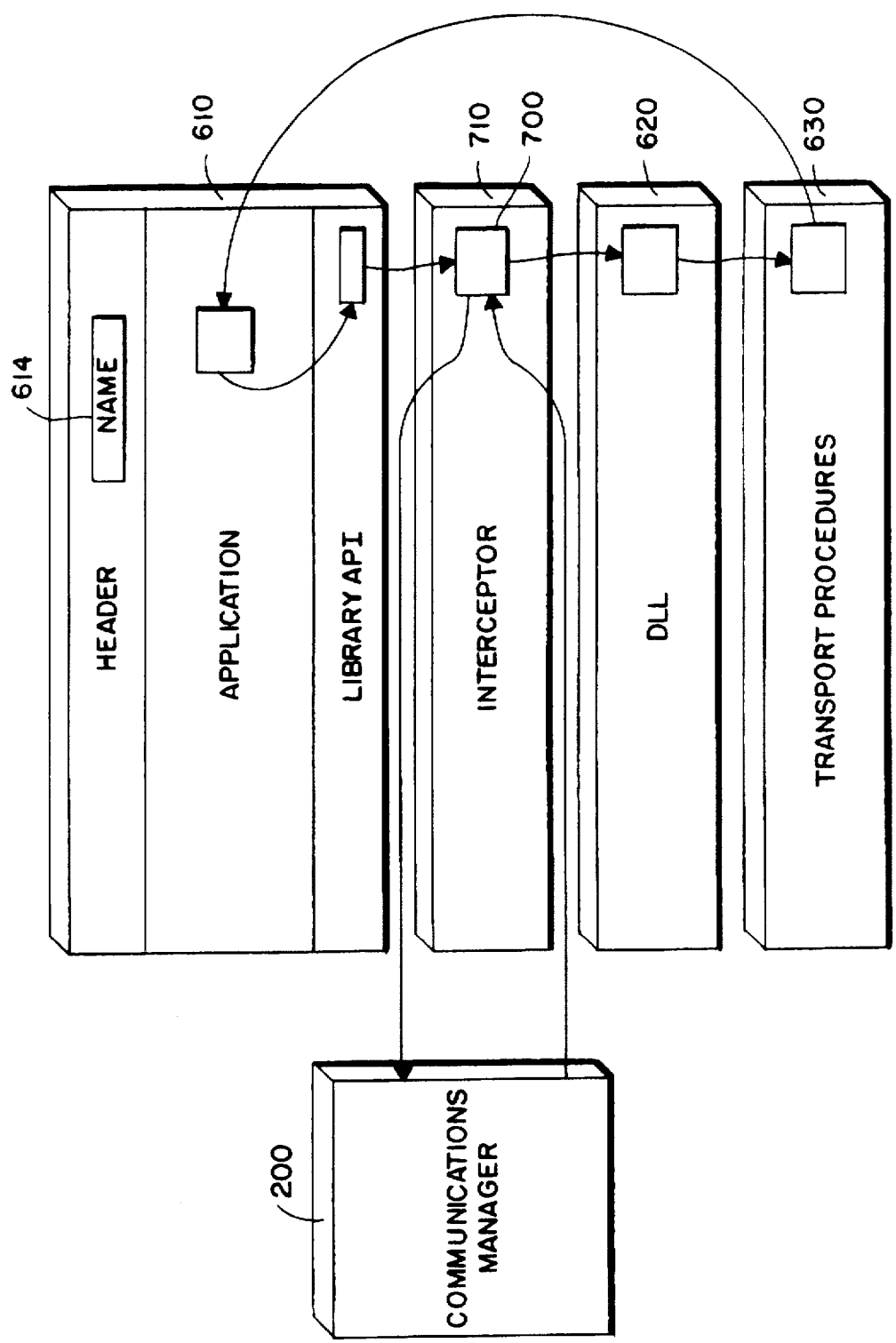
FIG. 7 is a flow diagram of the client application using a communications interceptor according to the invention.

FIG. 7 shows how the communications manager 200 can be interfaced to the client application 610 without any modification of the prior art client application 610. As an advantage of the invention, the client application 610 can be "mobilized" as is.

The name of the interceptor 700 is made the same as the DLL 620 of FIG. 6 which is being intercepted, e.g., "Winsock," and the DLL 620 is renamed to some other name, for example, "MobileWinsock." Thus, loading the application 610 also loads and links the interceptor 700.

The interceptor 700 includes procedures 710, one-to-one corresponding to each of the sockets of the DLL 620. However, the procedures 710, depending on a state of the communications connection, intercept the execution flow so that the appropriate procedures of the communication manager 200 can be executed. The manager 200 can call the transport procedures 630 to, for example, "bind" a socket to a physical communications port of the computer 110, after a communications link has been established using the CDI and communications database as described above.

Figure 8:
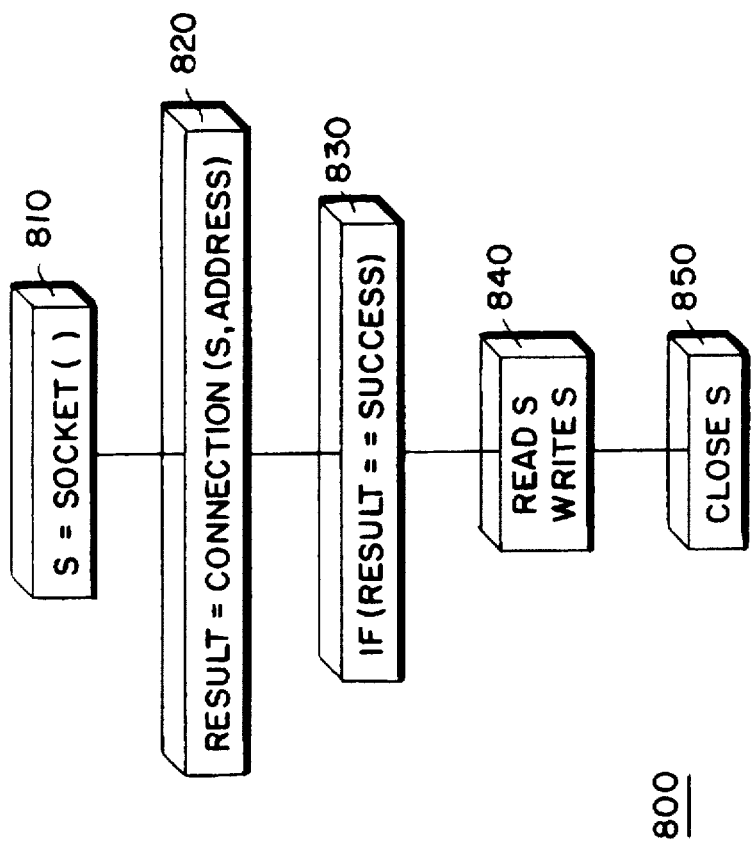
FIG. 8 shows steps of connecting a mobile client application to a server application.

For example, FIG. 8 shows the pertinent steps 800 of the client application 610 during a communication session. In step 810, the application 610 calls a function "socket" to obtain a "handle," e.g., a programming interface to the procedures 630. The execution flow for performing the function of step 810, as well as the other steps 820–850, are intercepted by the interceptor 700 and routed to the communication manager 200. The manager, upon a determination that a connection is not extant, enables the connection as described above. Once the connection is established, execution flow is returned to the application 610.

The logical addresses associated with the connection, e.g., port and server identifications, are provided in step 820. The successful establishment of the connection is determined in step 830. While the connection is continued, data can be communicated in step 840. Step 850 terminates the connection.

Figure 9:
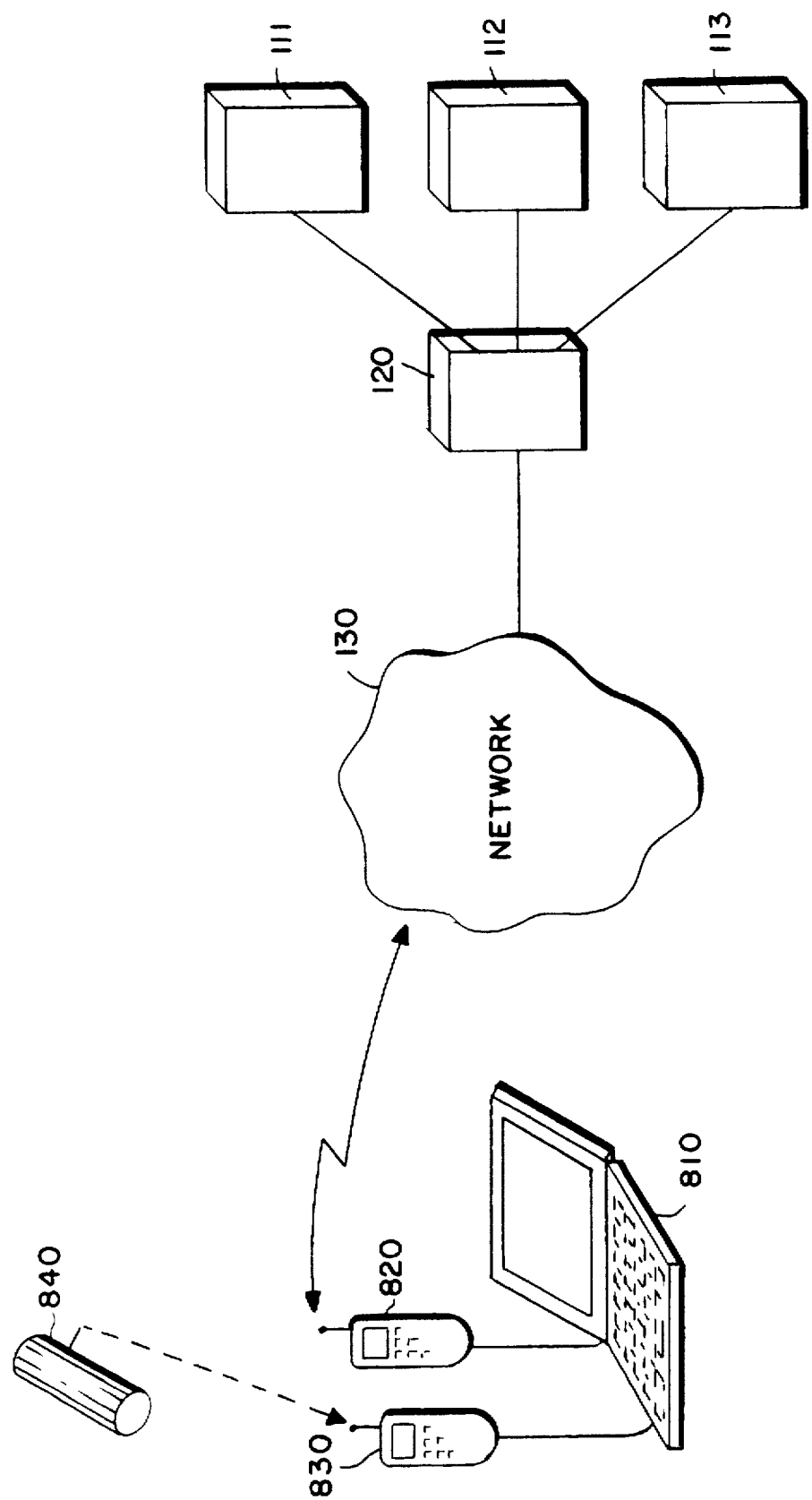
FIG. 9 shows an alternative distributed computing environment.

FIG. 9 shows an alternative embodiment of the invention. A lap-top computer 910 is connected to a cellular phone 920 and a global positioning system (GPS) module 930. The GPS module 930 receives location coordinates from a satellite 940. The location database 310 of the computer 110 is configured to associate cellular networks with access locations. Thus, a determination that the lap-top 910 is in a particular geographic area will select the preferred cellular carrier for the area. Thus, depending on the location of the lap-top 920, a connection can be immediately enabled via the cellular phone 920 when a client application is activated.

Disclosed are illustrative embodiments of the invention which allows a mobile client computer to access complex communication services provided by server processors. More specifically, users of mobile computers in a distributed computer environment can connect to and use server processes without modifying extant client applications which depend on the existence of a communication connection.

It should be understood that the servers can also initiate the connection. For example, with reference to FIG. 9, any of the servers 111–113 can "call" the mobile lap-top 910. The mobile lap-top 910 receives the call via the cellular phone 920. The modem of the lap-top is enabled to auto-answer the call and to execute client applications under the direction of the servers 111–113. Thus, the mobile lap-top 910 and the servers 111–113 can exchange information.

The invention is described using specific terms and examples. It is to be understood that various other adaptations and modifications may be made within the spirit and scope of the invention. Therefore, it is the object of the appended claims to cover such all such variations and modifications as come within the true spirit and scope of the invention.

We claim:

1. An apparatus for communicating via a communication network including a plurality of circuits, comprising:

a server processor executing a server application; and a client processor executing a client application, the client application generating a request to communicate with the server processor via the communication network, the client processor including;

means for processing the request, the means for processing and the client application expecting a connection between the client processor and the server processor via a selected one of the plurality of circuits of the communication network; and means for intercepting the request, the means for intercepting including;

means for establishing a connection between the client processor and the server processor via the selected one of the plurality of circuits of the network; and means for passing the request to the means for processing once the connection between the client processor and the server processor is established to enable the client processor to communicate with the server processor without modification of the client application.

2. The apparatus of claim 1, wherein the communication network includes a plurality of access locations, and wherein the client processor further comprises:

a memory storing a communication database, the communication database including information for establishing the connection between the client processor and the server processor dependent on a selected one of the plurality of access locations and a communication protocol to be used on the selected one of the plurality of circuits.

3. An apparatus for communicating via a communication network including a plurality of circuits, comprising:

a server processor executing a server application; and a client processor executing a client application, the client application generating a request to communicate with the server processor via the communication network, the client processor including;

means for processing the request, the means for processing and the client application expecting a connection between the client processor and the server processor via a selected one of the plurality of circuits of the communication network; and means for intercepting the request, the means for intercepting including;

means for connecting the client processor and the server processor via the selected one of the plurality of circuits of the network; and means for passing the request to the means for processing once the connection between the client processor and the server processor is established to enable the client processor to communicate with the server processor without modification to the client application;

wherein the communication network includes a plurality of access locations, wherein the client processor further includes a memory for storing a communication database, the communication database including information for connecting the client processor and the server processor dependent on a selected one of the plurality of access locations and a communication protocol to be used on the selected one of the plurality of circuits, wherein the communication database includes a location database, a security database, a profiles database, a resources database, and a script database.

4. The apparatus of claim 3, wherein the resources database includes a plurality of communication resource objects, the plurality of communication resource objects including modem, communication, telephone number, calling card, location, telephone list, logon, service, and network access communication resource objects.

5. The apparatus of claim 4, further comprising:

a set-up graphic user interface for adding, editing, and deleting the plurality of communication resource objects.

6. The apparatus of claim 3, further comprising:

means for connecting to a telephone line of the communication network at the selected one of the plurality of access locations;

means for dialing a telephone number on the telephone line to acquire the selected one of the plurality of circuits;

means for connecting, via the selected one of the plurality of circuits, to a router for connecting the communication network to the server processor.

7. The apparatus of claim 3, wherein the script database includes a plurality of script files and a script processor for processing a selected one of the plurality of script files to connect the server processor and the client processor to each other.

8. The apparatus of claim 3, further comprising means for monitoring the selected one of the plurality of circuits while the connection between the client processor and server processor is established.

9. A method for communication via a communication network including a plurality of circuits, comprising:

generating, by a client application executing on a client processor, a request to communicate with a server processor executing a server application, the client application expecting a connection between the client processor and the server processor;

intercepting the request;

connecting the client processor and the server processor via a selected one of the plurality of circuits; and passing the request to transport procedures of the client processor once the connection between the client processor and the server processor is established to enable the client processor to communicate with the server processor without modifying the client application.

10. The method of claim 9, further comprising:

storing a communication database in a memory of the client processor, the communication database including a plurality of communication resource objects;

selecting a subset of the plurality of resource objects to connect the client processor and the server processor depending on the selected one of the plurality of circuits and an access location of the communication network.

11. A client processor for communicating over a communication network having a plurality of communications circuits and a plurality of server processors, each having an executable server application, comprising:

a memory configured to store an executable client application having an application procedure for requesting a communications circuit be established between the client processor and a server processor, and a dynamic link library for linking the executable client application to a communications network;

a communications management service provider configured to manage a plurality of communications network protocols so as to provide connectivity between the client processor and the server processor over the communication network responsive to the request for the communications circuit; and an interceptor configured to receive the request for the communications circuit and to communicate the request for the communications circuit to the communications management service provider such that the requested communications circuit is established over a selected one of the plurality of communications circuits.

12. A client processor for communicating over a communication network having a plurality of communications circuits and a plurality of server processors, each having an executable server application, comprising:

a memory configured to store an executable client application having an application procedure for requesting a communications circuit be established between the client processor and a server processor, and a dynamic link library for linking the executable client application to a communications network protocol;

a communications management service provider configured to manage a plurality of communications network protocols so as to provide connectivity between the client processor and the server processor over the communication network responsive to the request for the communications circuit; and an interceptor configured to receive the request for the communications circuit and to communicate the request for the communications circuit to the communications management service provider such that the requested communications circuit is established over a selected one of the plurality of communications circuits;

wherein the dynamic link library has relocatable interfaces to the plurality of communications network protocols; and wherein the interceptor has interfaces to the plurality of communications network protocols corresponding to the relocatable interfaces.

13. A client processor according to claim 12, wherein the interceptor is designated with an original call name of the dynamic link library.

14. A client processor according to claim 11, wherein the selected one of the plurality of communications circuits is selected based upon a location of the client processor.

15. A client processor according to claim 14, wherein the location of the client processor is determined using GPS.

16. A client processor according to claim 12, wherein:

the interceptor is further configured to communicate the request for the communications circuit to the communications management service provider such that the requested communications circuit is established based on a remote access point to the server processor disposed along the selected communications circuit.

17. A client processor according to claim 16, wherein the remote access point is one of a router and a gateway.

18. A client processor according to claim 12, wherein:

the interceptor is further configured to communicate the request for the communications circuit to the communications management service provider such that the requested communications circuit is established based on specific requirements of the server processor to be accessed.

19. A client processor according to claim 11, wherein the selected one of the plurality of communications circuits is selected based on a designated communications circuit provider.

* * * * *